United States Patent
Dhong et al.

(10) Patent No.: US 6,232,872 B1
(45) Date of Patent: May 15, 2001

(54) COMPARATOR

(75) Inventors: Sang Hoo Dhong; Hung Cai Ngo; Jaehong Park, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,377

(22) Filed: Oct. 14, 1999

(51) Int. Cl.$^7$ .................................................. G06F 7/02
(52) U.S. Cl. .................................................. 340/146.2
(58) Field of Search ...................... 340/146.2; 328/119, 328/121

(56) References Cited

U.S. PATENT DOCUMENTS 4,225,849 * 9/1980 Lai ...................................... 340/146.2
5,630,160 * 5/1997 Simpson et al. .................. 340/146.2
5,978,305 * 11/1999 Sasaki et al. ..................... 365/230.03
6,046,669 * 4/2000 Giamei et al. .................... 340/146.2
6,054,918 * 4/2000 Holst ................................. 340/146.2

\* cited by examiner

*Primary Examiner*—Michael Tokar
*Assistant Examiner*—Don Phu Le
(74) *Attorney, Agent, or Firm*—Kelly K. Kordzik; Winstead Sechrest & Minick P.C.; Casimer K. Salys

(57) ABSTRACT

A 64-bit comparator includes a first stage for receiving a 64-bit number A and a 64-bit number B, and generating first output values. A second stage then receives the first output values from the first stage and outputs second output values, and a third stage receives the second output values from the second stage and outputs greater than, less than, and equivalent values. Thus, the comparator is faster in that it is implemented in three logic stages by making efficient use of compound dynamic gates.

15 Claims, 13 Drawing Sheets

COMPARATOR

TECHNICAL FIELD

The present invention relates in general to logic circuitry, and in particular, to a comparator.

BACKGROUND INFORMATION

A 64-bit comparator is built in a 4-way merge architecture to reduce the number of logic stages. Conventional ways of 4-way merge for a comparator are based on equations:

$$EQ(i)=A(i)B(i)+A\_B(i)B\_B(i)$$

$$GT(i)=A(i)B\_B(i)$$

$$LT(i)=A\_B(i)B(i)$$

$$EQ4(i)=EQ(i)EQ(i+1)EQ(i+2)EQ(i+3)$$

$$GT4(i)=GT(i)+EQ(i)GT(i+1)+EQ(i)EQ(i+1)GT(i+2)+EQ(i)EQ(i+1)EQ(i+2)GT(i+3)$$

$$LT4(i)=LT(i)+EQ(i)LT(i+1)+EQ(i)EQ(i+1)LT(i+2)+EQ(i)EQ(i+1)EQ(i+2)LT(i+3)$$

where A, B, A_B, and B_B are true and complemented inputs, EQ stands for EQuivalent, LT stands for Less Than, and GT stands for Greater Than. The above equations involve a 4-way AND, and the total number of logic stages is 4 assuming that the maximum number of transistors allowed on an N stack is 4, which is usually the case.

Such a comparator is often utilized in execution units in a microprocessor or a microcontroller. Chip designers are always searching for new designs that offer faster computation times to thereby increase the throughput of the processor. If a particular circuit or macro can be made faster, then it is often possible to increase the throughput in other circuits or macros. Therefore, what is desired is a faster 64-bit comparator.

SUMMARY OF THE INVENTION

The present invention addresses the foregoing need by providing a faster comparator that is implemented in three logic stages by making efficient use of compound dynamic gates.

A 64-bit comparator includes a first stage for receiving a 64-bit number A and a 64-bit number B, and generating first output values. A second stage then receives the first output values from the first stage and outputs second output values, and a third stage receives the second output values from the second stage and outputs greater than, less than, and equivalent values.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
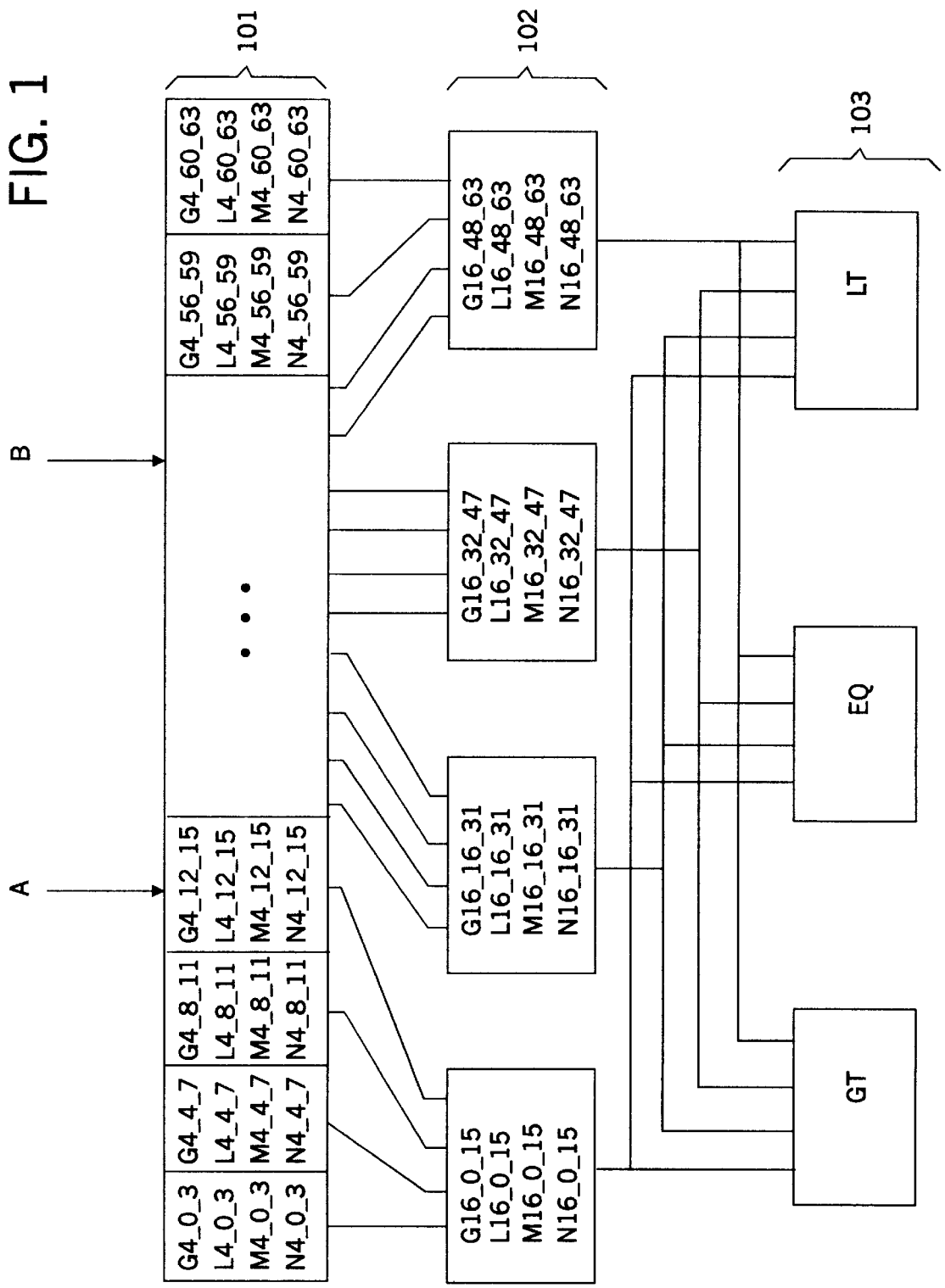
FIG. 1 is a block diagram of the present invention.

FIG. 1 illustrates a block diagram of the three-stage 64-bit comparator of the present invention. Two 64-bit numbers A and B are received at the first stage 101, which produces the G4, L4, M4 and N4 values, which are passed to the second stage 102, which produces the G16, L16, M16, and N16 values, which are then passed to the third stage 103, which produces the greater than (GT), less than (LT), and equivalent (EQ) values outputted from the comparator.

Suppose $$G(i)=A(i) \, B\_B(i) \quad \text{(eq. 1)}$$

$$L(i)=A\_B(i) \, B(i) \quad \text{(eq. 2)}$$

$$M(i)=A(i)+B\_B(i) \quad \text{(eq. 3)}$$

$$N(i)=A\_B(i)+B(i) \quad \text{(eq. 4)}$$

where G stands for greater than, L stands for less than, M stands for greater than or equal, and N stands for less than or equal.

At the first stage 101, 4-way merge of the 4 signals is performed as follows:

$$G4(i)=G(i)+M(i)G(i+1)+M(i)M(i+1)G(i+2)+M(i)M(i+1)M(i+2)G(i+3) \quad \text{(eq. 5)}$$

$$L4(i)=L(i)+N(i)L(i+1)+N(i)N(i+1)L(i+2)+N(i)N(i+1)N(i+2)L(i+3) \quad \text{(eq. 6)}$$

$$M4(i)=G(i)+M(i)G(i+1)+M(i)M(i+1)G(i+2)+M(i)M(i+1)M(i+2)M(i+3) \quad \text{(eq. 7)}$$

$$N4(i)=L(i)+N(i)L(i+1)+N(i)N(i+1)L(i+2)+N(i)N(i+1)N(i+2)N(i+3) \quad \text{(eq. 8)}$$

Since $G(i)M(i)=G(i)$, and $L(i)N(i)=L(i)$ from equations (1)–(4), equations (5), (6), (7), and (8) can be rewritten as $$G4(i)=(G(i)+M(i)M(i+1))(G(i)+G(i+1)+G(i+2)+M(i+2)G(i+3)) \quad \text{(eq. 9)}$$

$$L4(i)=(L(i)+N(i)N(i+1))(L(i)+L(i+1)+L(i+2)+N(i+2)L(i+3)) \quad \text{(eq. 10)}$$

$$M4(i)=(G(i)+M(i)M(i+1))\ (G(i)+G(i+1)+G(i+2)+M(i+2)M(i+3)) \quad \text{(eq. 11)}$$

$$N4(i)=(L(i)+N(i)N(i+1))\ (L(i)+L(i+1)+L(i+2)+N(i+2)N(i+3)) \quad \text{(eq. 12)}$$

Figure 2:
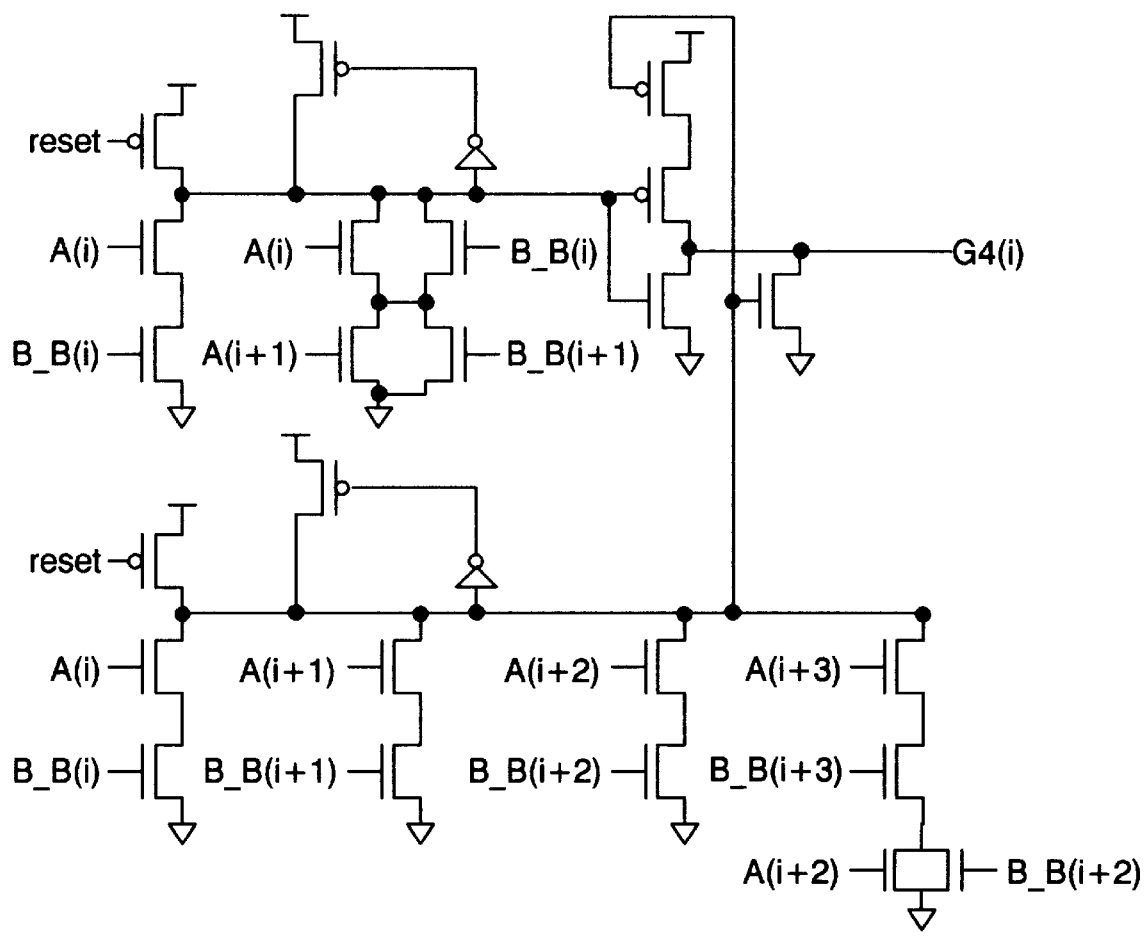
FIG. 2 illustrates a circuit structure producing G4.
Figure 3:
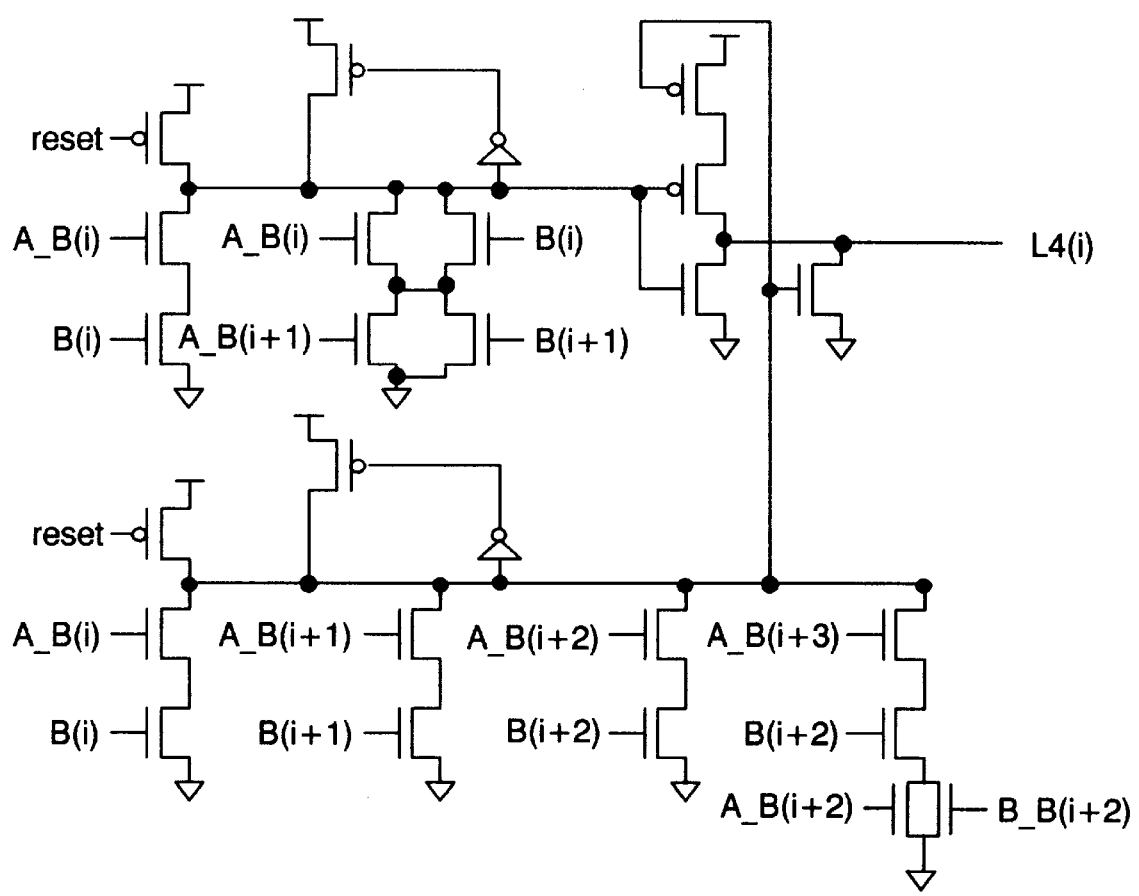
FIG. 3 illustrates a circuit structure producing L4.
Figure 4:
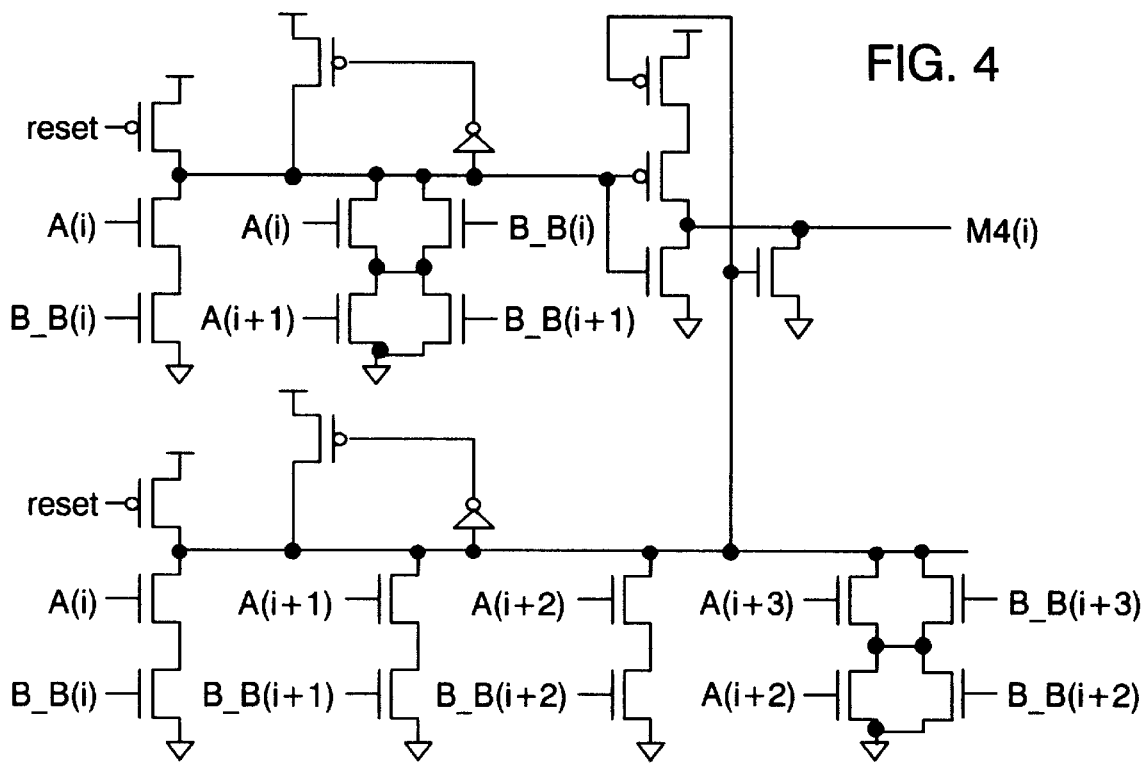
FIG. 4 illustrates a circuit structure producing M4.
Figure 5:
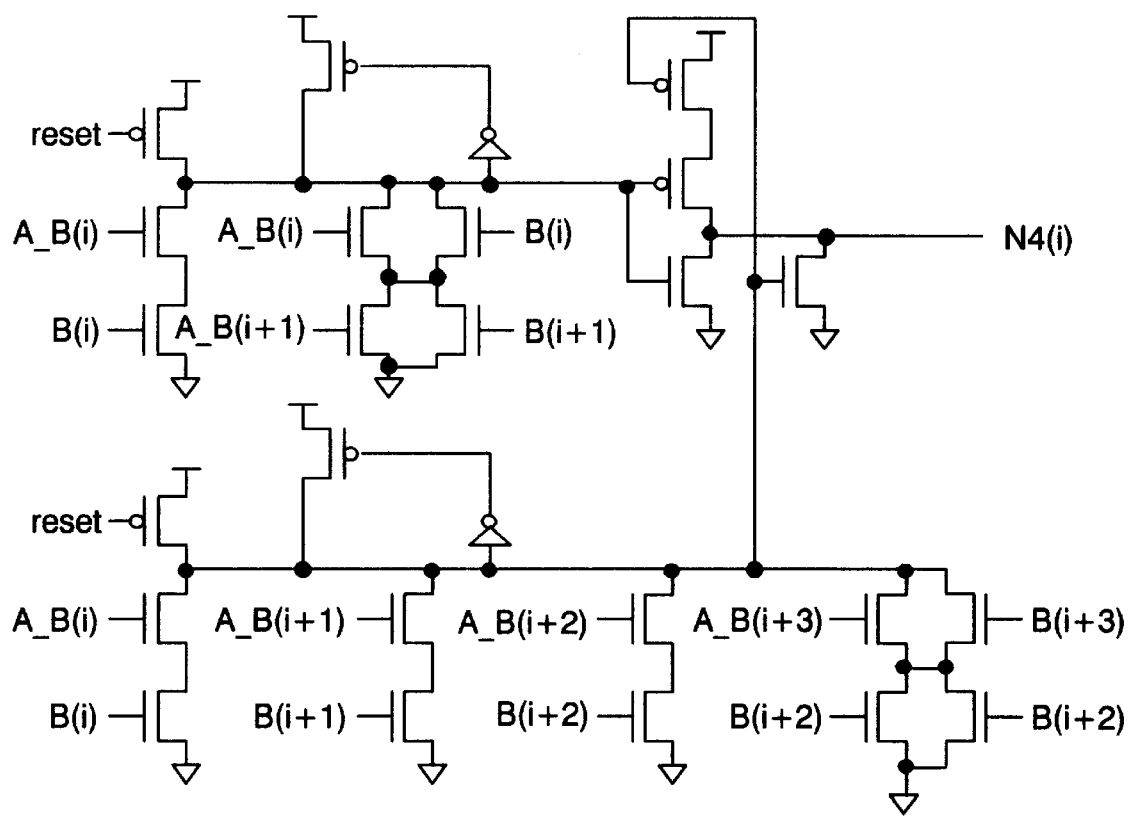
FIG. 5 illustrates a circuit structure producing N4.

After replacing G and M with equations (1)–(4), equation (9) can be efficiently implemented with a compound dynamic gate as in FIG. 2. Equation (10) can be implemented in a similar way as illustrated in FIG. 3. FIG. 4 shows how equation (11) can be implemented, and equation (12) can be implemented in a similar manner as illustrated in FIG. 5.

At the second stage 102, G16, L16, M16, and N16 are implemented using the following equations:

$$G16(i)=(G4(i)+M4(i)M4(i+4))\ (G4(i)+G4(i+4)+G4(i+8)+M4(i+8)G4(i+12)) \quad \text{(eq. 13)}$$

$$L16(i)=(L4(i)+N4(i)N4(i+4))\ (L4(i)+L4(i+4)+L4(i+8)+N4(i+8)L4(i+12)) \quad \text{(eq. 14)}$$

$$M16(i)=(G4(i)+M4(i)M4(i+4))\ (G4(i)+G4(i+4)+G4(i+8)+M4(i+8)M4(i+12)) \quad \text{(eq. 15)}$$

$$N16(i)=(L4(i)+N4(i)N4(i+4))\ (L4(i)+L4(i+4)+L4(i+8)+N4(i+8)N4(i+12)) \quad \text{(eq. 16)}$$

Figure 6:
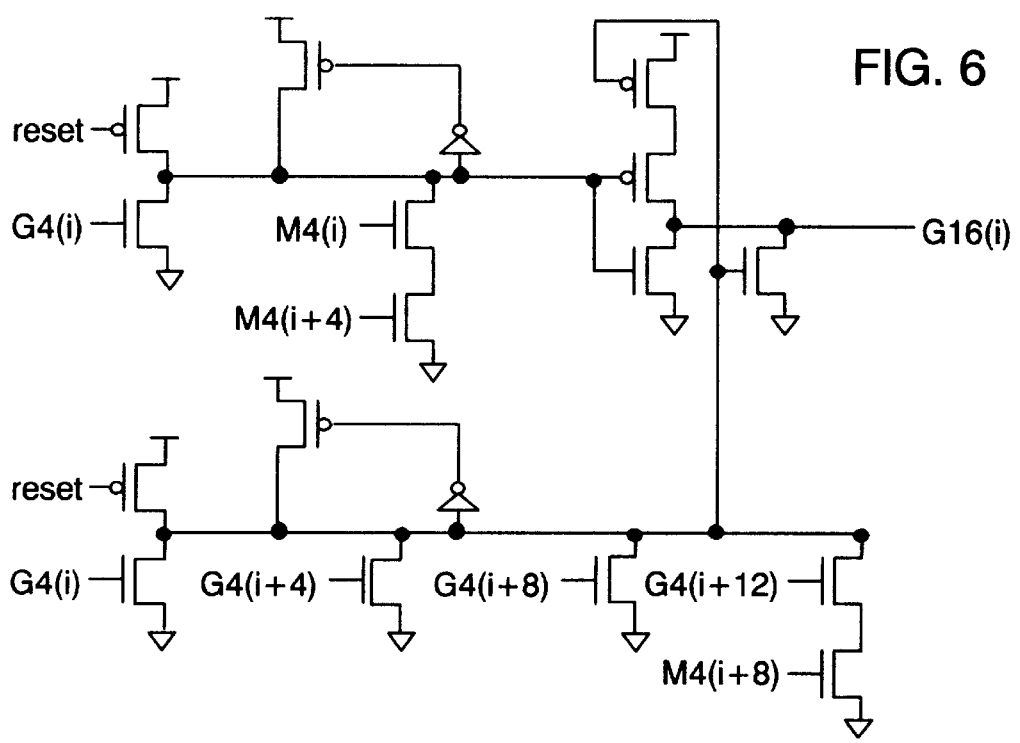
FIG. 6 illustrates a circuit structure producing G16.
Figure 8:
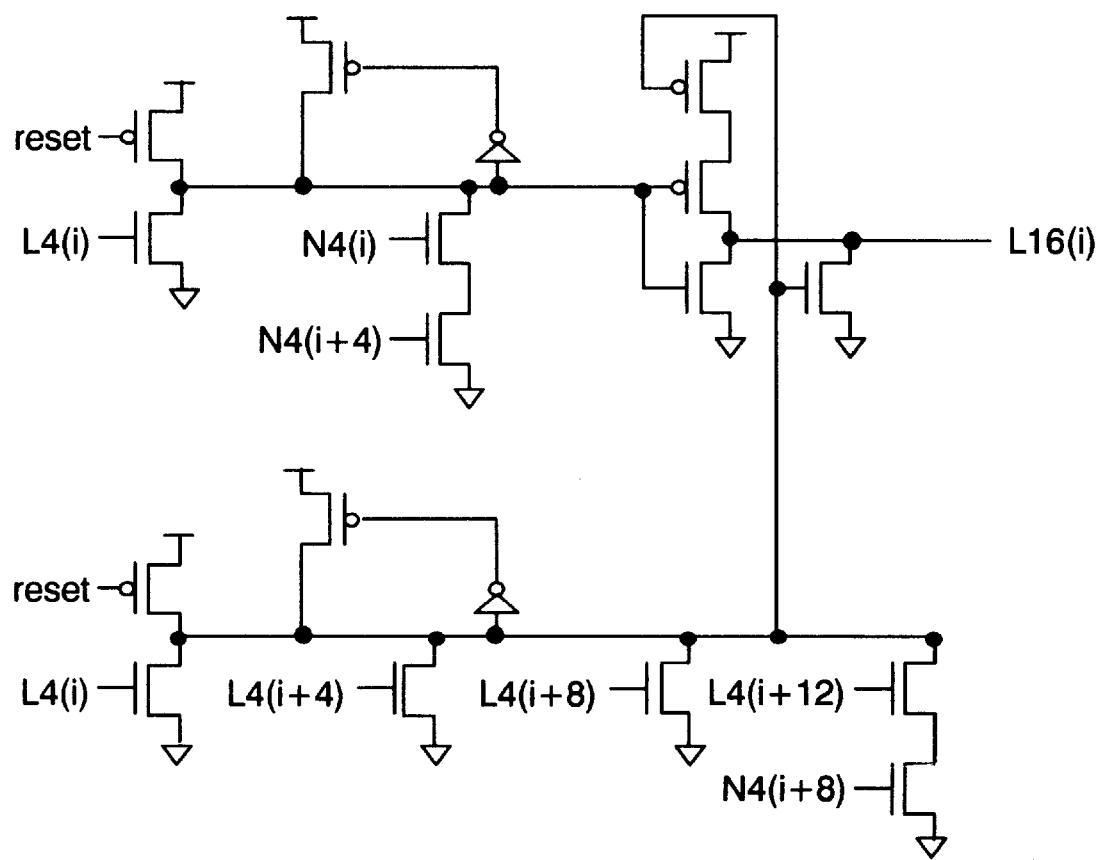
FIG. 8 illustrates a circuit structure producing L16.
Figure 9:
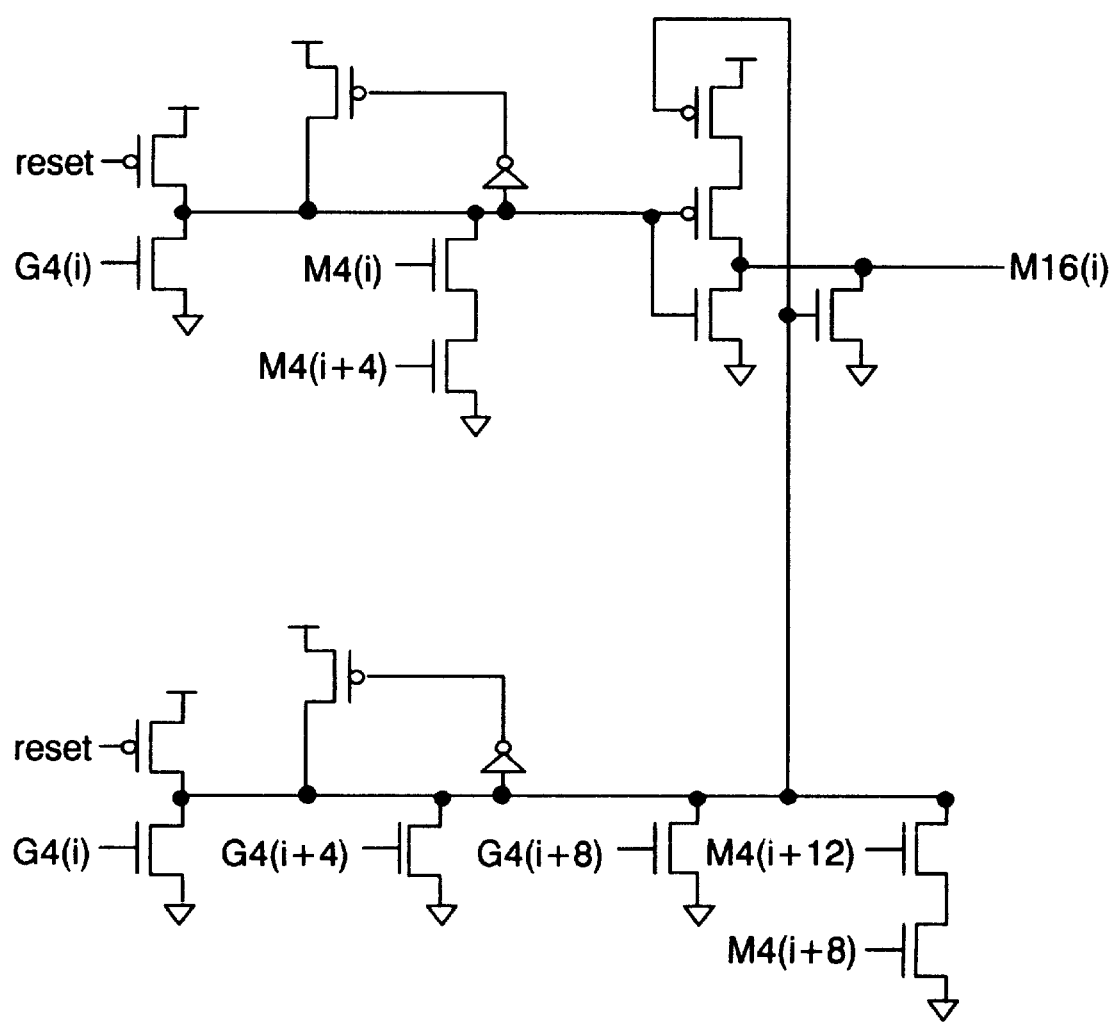
FIG. 9 illustrates a circuit structure producing M16.
Figure 10:
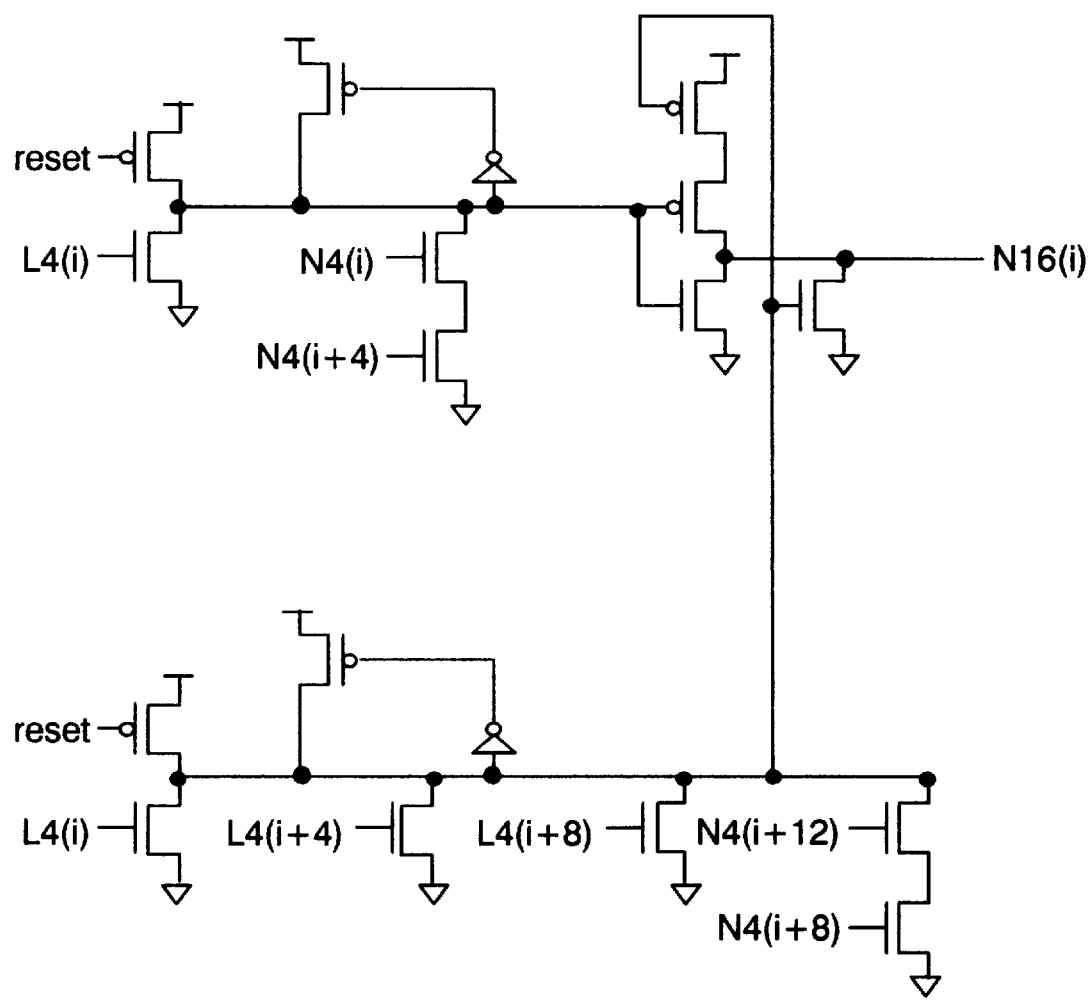
FIG. 10 illustrates a circuit structure producing N16.

FIG. 6 illustrates how Equation (13) is implemented, and equations (14), (15), and (16) can be implemented in similar ways as illustrated in FIGS. 8, 9 and 10, respectively. At the third (final) stage 103, the final outputs, GT (greater than), LT (less than), and EQ (equal) are computed as follows:

$$GT=(G16(0)+M16(0)M16(16))\ (G16(0)+G16(16)+G16(32)+M16(32)G16(48)) \quad \text{(eq. 17)}$$

$$LT=(L16(0)+N16(0)N16(16))\ (L16(0)+L16(16)+L16(32)+N16(32)L16(48)) \quad \text{(eq. 18)}$$

$$EQ=(M16(0)M16(16)M16(32)M16(48))(N16(0)N16(16)N16(32)N16(48)) \quad \text{(eq. 19)}$$

Figure 11:
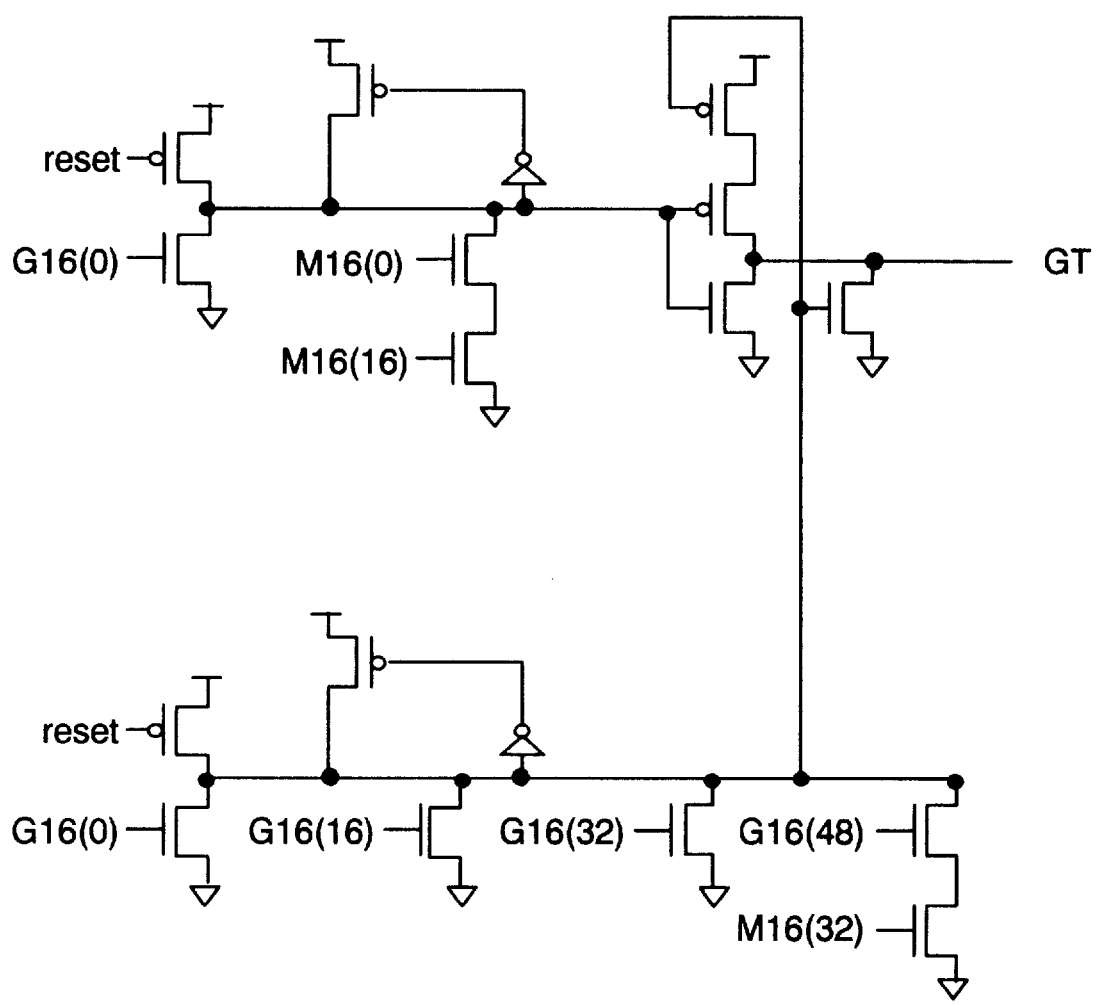
FIG. 11 illustrates a circuit structure producing GT.
Figure 12:
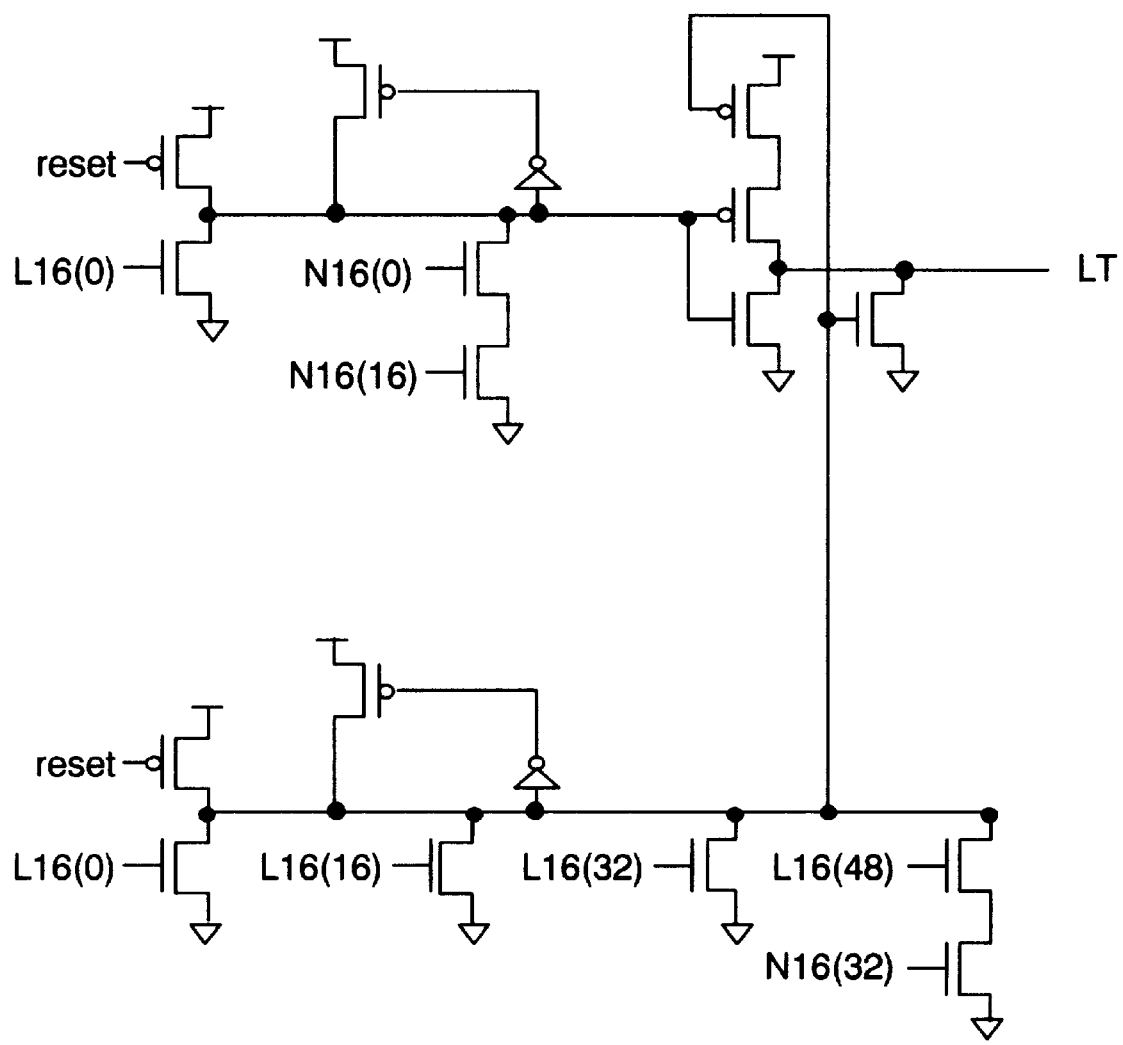
FIG. 12 illustrates a circuit structure producing LT.
Figure 13:
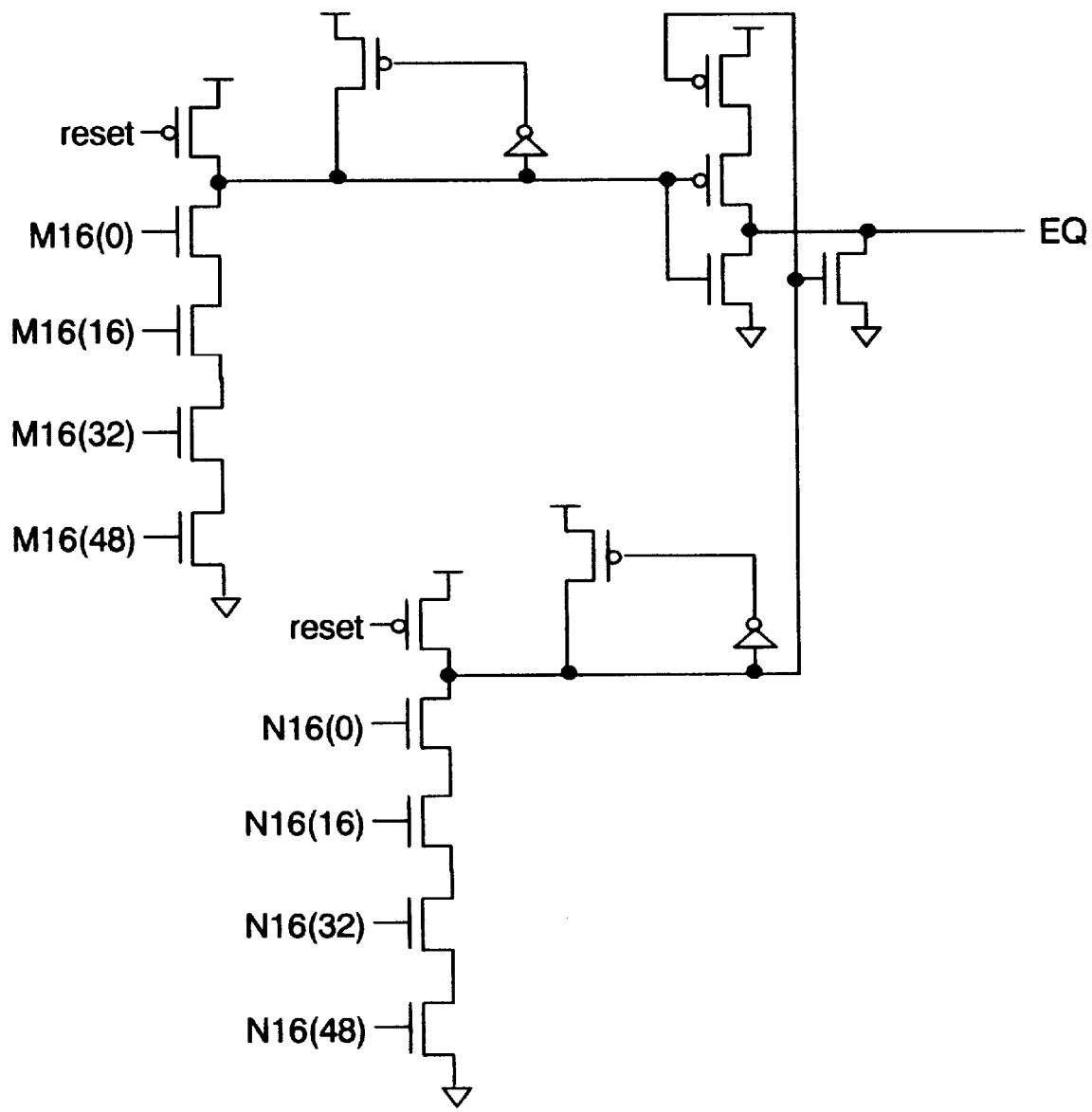
FIG. 13 illustrates a circuit structure producing EQ.

Equations (17), (18) and (19) can be implemented as illustrated in FIGS. 11–13, respectively.

The comparator of the present invention can be utilized in many locations in a processor, such as execution units, branch history tables, and addressing mechanisms in cache memories. Such a processor is described with respect to FIGS. 7 and 14.

Figure 14:
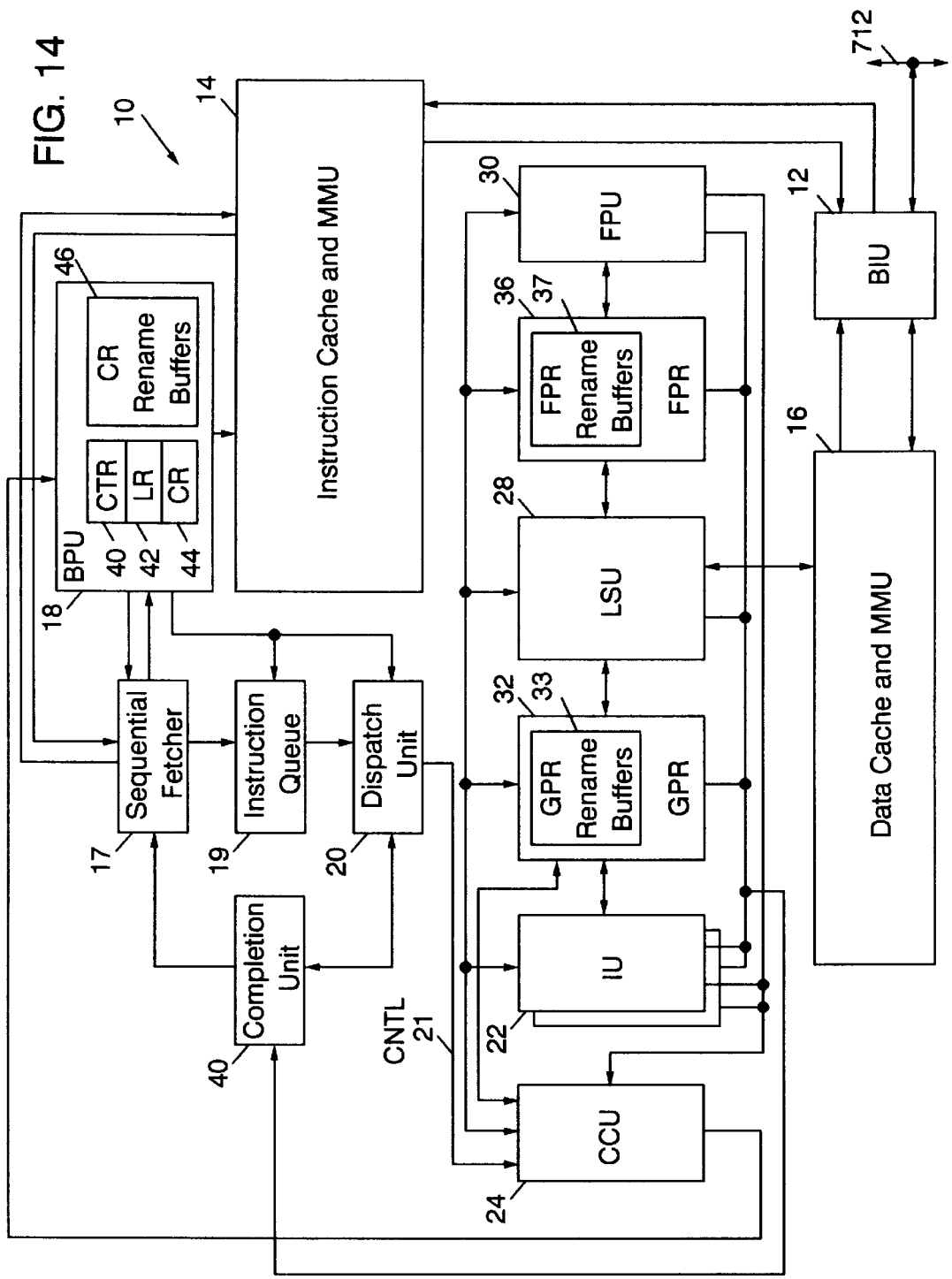
FIG. 14 illustrates an integrated circuit configured in accordance with the present invention.

With reference now to FIG. 14, there is depicted a block diagram of an illustrative embodiment of a processor, indicated generally at 710. In the depicted illustrative embodiment, processor 710 comprises a single integrated circuit superscalar microprocessor. Accordingly, as discussed further below, processor 710 includes various executions units, registers, buffers, memories, and other functional units, which are all formed by integrated circuitry.

Processor 710 is coupled to bus 712 via a bus interface unit (BIU) 12 within processor 710. BIU 12 controls the transfer of information between processor 710 and other devices coupled to bus 712, such as a lower level cache or main memory (see FIG. 7) which together with processor 710 and bus 712 form a fully functional data processing system 713. BIU 12 is also connected to instruction cache 14 and data cache 16 within processor 710. High-speed caches, such as instruction cache 14 and data cache 16, enable processor 710 to achieve relatively fast access times to a subset of data or instructions previously transferred from lower level memory to caches 14 and 16, thus improving the overall performance of the data processing system 713. Instruction cache 14 is further connected to sequential fetcher 17, which fetches up to a cache line of instructions from instruction cache 14 during each cycle and transmits the fetched instructions to both branch processing unit (BPU) 18 and instruction queue 19. Branch instructions are retained by BPU 18 for execution and are canceled from instruction queue 19; sequential instructions, on the other hand, are canceled from BPU 18 and buffered within instruction queue 19 for subsequent execution by sequential instruction execution circuitry within processor 710.

BPU 18 includes count register (CTR) 40, link register (LR) 42, and condition register (CR) 44, the value of which may be utilized to resolve conditional branch instructions. BPU 18 further includes CR rename buffers 46, which temporarily store renamed copies of CR 44 generated by the execution of compare instructions or concurrent with the execution of certain recording instructions. In a preferred embodiment, CR 44 (and each of CR rename buffers 46) contains a number of distinct fields that each comprise one or more bits. Conditional branch instructions that cannot be resolved prior to execution by reference to CR 44, LR 42 or CTR 40 are preferably predicted utilizing conventional branch processing circuitry within BPU 18 such as a branch history table (BHT) or branch target address cache (BTAC).

In the depicted illustrative embodiment, in addition to BPU 18, the execution circuitry of processor 710 comprises multiple execution units for sequential instructions, including one or more integer units (IUs) 22, a load-store unit (IU$_s$) 28, and a floating-point unit (FPU) 30. As is well-known to those skilled in the computer arts, each of execution units 22, 28, and 30 typically executes one or more instructions of a particular type of sequential instructions during each processor cycle. For example, IU(s) 22 perform integer mathematical and logical operations such as addition, subtraction, ANDing, ORing, and XORing, utilizing source operands received from specified general purpose registers (GPRs) 32 or GPR rename buffers 33. Following the execution of an integer instruction, IU 22 outputs the data results of the instruction to GPR rename buffers 33, which provide temporary storage for the result data until the result data is written from GPR rename buffers 33 to one or more of GPRs 32. FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the result data is written from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 367 or which store data from a selected one of GPRs 32, GPR rename buffers 33, FPRs 36, or FPR rename buffers 37 to memory.

Figure 7:
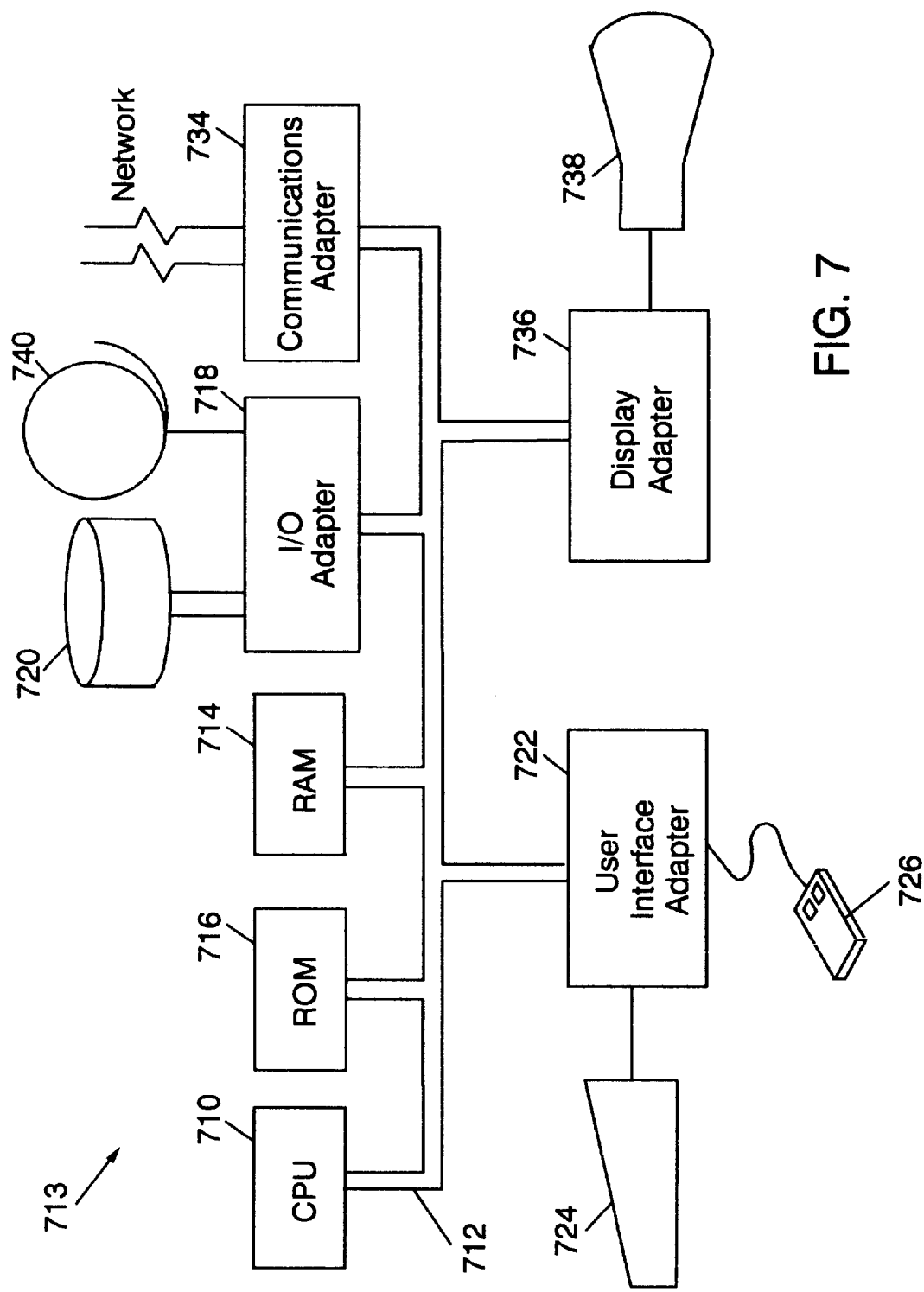
FIG. 7 illustrates a data processing system configured in accordance with the present invention.

FIG. 7 illustrates a typical hardware configuration of data processing system 713 in accordance with the subject invention having central processing unit (CPU) 710, described above in FIG. 14, and a number of other units interconnected via system bus 712. Data processing system 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, and/or other user interface devices such as a touch screen device (not shown) to bus 712, communication adapter 734 for connecting data processing system 713 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A 64-bit comparator comprising:
   a first stage operable for receiving a 64-bit number A and a 64-bit number B, and generating first output values;
   a second stage operable for receiving the first output values from the first stage and outputting second output values; and
   a third stage operable for receiving the second output values from the second stage and outputting greater than (GT), less than (LT), and equivalent (EQ) values.

2. The comparator as recited in claim 1, wherein logic circuitry implementing the stages utilizes no more than three transistors in series per N stack.

3. The comparator as recited in claim 1, wherein the first output values are computed as follows:
   $G4(i)=(A(i)B\_B(i)+(A(i)+B\_B(i)) (A(i+1)+B\_B(i+1))) (A(i)B\_B(i)+A(i+1)B\_B(i+1)+A(i+2)B\_B(i+2)+(A(i+2)+B\_B(i+2))A(i+3)B\_B(i+3));$
   $LA(i)=(A\_B(i)B(i)+(A\_B(i)+B(i)) (A\_B(i+1)+B(i+1))) (A\_B(i)B(i)+A\_B(i+1)B(i+1)+A\_B(i+2)B(i+2)+(A\_B(i+2)+B(i+2))A\_B(i+3)B(i+3));$
   $M4(i)=(A(i)B\_B(i)+(A(i)+B\_B(i)) (A(i+1)+B\_B(i+1))) (A(i)B\_B(i)+A(i+1)B\_B(i+1)+A(i+2)B\_B(i+2)+(A(i+2)+B\_B(i+2)) (A(i+3)+B\_B(i+3)));$ and
   $N4(i)=(A\_B(i)B(i)+(A\_B(i)+B(i)) (A\_B(i+1)+B(i+1))) (A\_B(i)B(i)+A\_B(i+1)B(i+11)+A\_B(i+2)B(i+2)+(A\_B(i+2)+B(i+2)) (A\_B(i+3)+B(i+3))).$ 4. The comparator as recited in claim 3, wherein the second output values are computed as follows:
   $G16(i)=(G4(i)+M4(i)M4(i+4))(G4(i)+G4(i+4)+G4(i+8)+M4(i+8)G4(i+12));$
   $L16(i)=(L4(i)+N4(i)N4(i+4))(LA(i)+L4(i+4)+L4(i+8)+N4(i+8)L4(i+12));$
   $M16(i)=(G4(i)+M4(i)M4(i+4))(G4(i)+G4(i+4)+G4(i+8)+M4(i+8)M4(i+12));$ and
   $N16(i)=(L4(i)+N4(i)N4(i+4))(LA(i)+L4(i+4)+L4(i+8)+N4(i+8)N4(i+12)).$ 5. The comparator as recited in claim 4, wherein the GT, LT, and EQ values are computed as follows:
   $GT=(G16(0)+M16(0)M16(16))(G16(0)+G16(16)+G16(32)+M16(32)G16(48));$
   $LT=(L16(0)+N16(0)N16(16))(L16(0)+L16(16)+L16(32)+N16(32)L16(48));$ and
   $EQ=(M16(0)M16(16)M16(32)M16(48))(N16(0)N16(16)N16(32)N16(48)).$ 6. A cache memory including a comparator for comparing an address received by the cache memory with an address stored in the cache memory comprising:
   a first stage operable for receiving a 64-bit number A and a 64-bit number B, and generating first output values;
   a second stage operable for receiving the first output values from the first stage and outputting second output values; and
   a third stage operable for receiving the second output values from the second stage and outputting greater than (GT), less than (LT), and equivalent (EQ) values.

7. The cache memory as recited in claim 6, wherein logic circuitry implementing the stages utilizes no more than three transistors in series per N stack.

8. The cache memory as recited in claim 6, wherein the first output values are computed as follows:
   $G4(i)=(A(i)B\_B(i)+(A(i)+B\_B(i)) (A(i+1)+B\_B(i+1))) (A(i)B\_B(i)+A(i+1)B\_B(i+1)+A(i+2)B\_B(i+2)+(A(i+2)+B\_B(i+2))A(i+3)B\_B(i+3));$
   $L4(i)=(A\_B(i)B(i)+(A\_B(i)+B(i)) (A\_B(i+1)+B(i+1))) (A\_B(i)B(i)+A\_B(i+1)B(i+1)+A\_B(i+2)B(i+2)+(A\_B(i+2)+B(i+2))A\_B(i+3)B(i+3));$
   $M4(i)=(A(i)B\_B(i)+(A(i)+B\_B(i)) (A(i+1)+B B(i+1))) (A(i)B B(i)+A(i+1)B\_B(i+1)+A(i+2)B\_B(i+2)+(A(i+2)+B\_B(i+2)) (A(i+3)+B\_B(i+3)));$ and
   $N4(i)=(A\_B(i)B(i)+(A\_B(i)+B(i)) (A\_B(i+1)+B(i+1))) (A\_B(i)B(i)+A\_B(i+1)B(i+1)+A\_B(i+2)B(i+2)+(A\_B(i+2)+B(i+2)) (A\_B(i+3)+B(i+3))).$ 9. The cache memory as recited in claim 8, wherein the second output values are computed as follows:
   $G16(i)=(G4(i)+M4(i)M4(i+4)) (G4(i)+G4(i+4)+G4(i+8)+M4(i+8)G4(i+12));$
   $L16(i)=(L4(i)+N4(i)N4(i+4)) (L4(i)+L4(i+4)+L4(i+8)+N4(i+8)L4(i+12));$
   $M16(i)=(G4(i)+M4(i)M4(i+4)) (G4(i)+G4(i+4)+G4(i+8)+M4(i+8)M4(i+12));$ and
   $MN6(i)=(L4(i)+N4(i)N4(i+4)) (G4(i)+L4(i+4)+L4(i+8)+N4(i+8)N4(i+12)).$ 10. The cache memory as recited in claim 9, wherein the GT, LT, and EQ values are computed as follows:
    $GT=(G16(0)+M16(0)M16(16))(G16(0)+G16(16)+G16(32)+M16(32)G16(48));$
    $LT=(L16(0)+N16(0)N16(16))(L16(0)+L16(16)+L16(32)+N16(32)L16(48));$ and
    $EQ=(M16(0)M16(16)M16(32)M16(48))(N16(0)N16(16)N16(32)N16(48)).$ 11. An integrated circuit comprising:
    a plurality of execution units coupled to a cache memory, wherein the cache memory includes a comparator comprising a cache memory including a comparator for comparing an address received by the cache memory with an address stored in the cache memory, the comparator further comprising:
    a first stage operable for receiving a 64-bit number A and a 64-bit number B, and generating first output values;
    a second stage operable for receiving the first output values from the first stage and outputting second output values; and
    a third stage operable for receiving the second output values from the second stage and outputting greater than (GT), less than (LT), and equivalent (EQ) values.

12. The integrated circuit as recited in claim 11, wherein logic circuitry implementing the stages utilizes no more than three transistors in series per N stack.

13. The integrated circuit as recited in claim 11, wherein the first output values are computed as follows:
    $G4(i)=(A(i)B\_B(i)+(A(i)+B\_B(i)) (A(i+1)+B\_B(i+1))) (A(i)B\_B(i)+A(i+1)B\_B(i+1)+A(i+2)B\_B(i+2)+(A(i+2)+B\_B(i+2))A(i+3)B\_B(i+3))$
    $L4(i)=(A\_B(i)B(i)+(A\_B(i)+B(i)) (A\_B(i+1)+B(i+1))) (A\_B(i)B(i)+A\_B(i+1)B(i+1)+A\_B(i+2)B(i+2)+(A\_B(i+2)+B(i+2))A\_B(i+3)B(i+3))$
    $M4(i)=(A(i)B\_B(i)+(A(i)+B\_B(i)) (A(i+1)+B\_B(i+1))) (A(i)B\_B(i)+A(i+1)B\_B(i+1)+A(i+2)B\_B(i+2)+(A(i+2)+B\_B(i+2)) (A(i+3)+B\_B(i+3)))$ $N4(i)=(A\_B(i)B(i)+(A\_B(i)+B(i))\ (A\_B(i+1)+B(i+1)))\ (A\_B(i)B(i)+A\_B(i+1)B(i+1)+A\_B(i+2)B(i+2)+(A\_B(i+2)+B(i+2))\ (A\_B(i+3)+B(i+3)))$.

14. The integrated circuit as recited in claim 13, wherein the second output values are computed as follows:

$G16(i)=(G4(i)+M4(i)M4(i+4))\ (G4(i)+G4(i+4)+G4(i+8)+M4(i+8)G4(i+12))$;

$L16(i)=(L4(i)+N4(i)N4(i+4))\ (L4(i)+L4(i+4)+L4(i+8)+N4(i+8)L4(i+12))$;

$M16(i)=(G4(i)+M4(i)M4(i+4))\ (G4(i)+G4(i+4)+G4(i+8)+M4(i+8)M4(i+12))$; and $N16(i)=(L4(i)+N4(i)N4(i+4))\ (L4(i)+L4(i+4)+L4(i+8)+N4(i+8)N4(i+12))$.

15. The integrated circuit as recited in claim 14, wherein the GT, LT, and EQ values are computed as follows:

$GT=(G16(0)+M16(0)M16(16))(G16(0)+G16(16)+G16(32)+M16(32)G16(48))$;

$LT=(L16(0)+N16(0)N16(16))(L16(0)+L16(16)+L16(32)+N16(32)L16(48))$; and $EQ=(M16(0)M16(16)M16(32)M16(48))(N16(0)N16(16)N16(32)N16(48))$.

* * * * *

UNITED STATES PATENT AND TRADEMARK OFFICE
CERTIFICATE OF CORRECTION

PATENT NO.   : 6,232,872 B1
DATED        : May 15, 2001
INVENTOR(S)  : Sang Hoo Dhong, Hung Cai Ngo and Jaehong Park It is certified that error appears in the above-identified patent and that said Letters Patent is hereby corrected as shown below:

Column 2,
Line 56, please replace

"L4(i) = L(i) + N(i)L(i+1) + N(i)N(i+1)L(i+2) + N(i)N(i+1)N(i+2)L(i+2).  6)"
with
--L4(i) = L(i) + N(i)L(i+1) + N(i)N(i+1)L(i+2) + N(i)N(i+1)N(i+2)L(i+3)
                                                                    (eq. 6)--

Line 60, please replace

"N4(i) = L(i) + N(i)L(i+1) + N(i)N(i+1)L(i+2) + N(i)N(i+1)N(i+2)N(i+2).  8)"
with
--N4(i) = L(i) + N(i)L(i+1) + N(i)N(i+1)L(i+2) + N(i)N(i+1)N(i+2)N(i+3)
                                                                    (eq. 8)--

Column 4,
Line 25, please replace "(IU$_s$)" with -- (LSU) --.

Column 5,
Lines 28 and 41, replace "LA(i) with -- L4(i) --.

Column 6,
Line 12, please replace "(A(i+1)+B B(i+1)))" with -- (A(i+1)+B_B(i+1))) --.
Line 13, please replace "(A(i)B B(i)" with -- (A(i)B_B(i) --.
Line 26, please replace "MN6(i)" with -- N16(i) --.
Line 26, please replace "G4(i)" with -- L4(i) --.

Signed and Sealed this

Twenty-ninth Day of April, 2003

JAMES E. ROGAN
*Director of the United States Patent and Trademark Office*